United States Patent
Selvakumar

(10) Patent No.: US 7,275,078 B2
(45) Date of Patent: Sep. 25, 2007

(54) DISTRIBUTED WEB CGI ARCHITECTURE

(75) Inventor: Manickam Selvakumar, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 1108 days.

(21) Appl. No.: 09/733,596

(22) Filed: Dec. 8, 2000

(65) Prior Publication Data
US 2002/0073173 A1   Jun. 13, 2002

Related U.S. Application Data

(60) Provisional application No. 60/173,751, filed on Dec. 30, 1999.

(51) Int. Cl.
*G06F 15/16* (2006.01)
(52) U.S. Cl. .............. 709/201; 716/4; 707/10; 717/100; 705/26
(58) Field of Classification Search .......... 705/26, 705/8, 9, 2; 707/10, 203, 150, 6; 709/217, 709/205, 224, 201, 219, 225, 229; 717/100, 717/103; 716/1; 713/150; 726/11
See application file for complete search history.

(56) References Cited

U.S. PATENT DOCUMENTS

| | | | | |
|---|---|---|---|---|
| 5,548,506 A | * | 8/1996 | Srinivasan | 705/8 |
| 5,778,368 A | * | 7/1998 | Hogan et al. | 707/10 |
| 5,892,905 A | * | 4/1999 | Brandt et al. | 726/11 |
| 5,950,201 A | * | 9/1999 | Van Huben et al. | 707/10 |
| 6,163,878 A | * | 12/2000 | Kohl | 717/100 |
| 6,236,994 B1 | * | 5/2001 | Swartz et al. | 707/6 |
| 6,304,967 B1 | * | 10/2001 | Braddy | 713/150 |
| 6,308,164 B1 | * | 10/2001 | Nummelin et al. | 705/9 |
| 6,341,291 B1 | * | 1/2002 | Bentley et al. | 707/203 |
| 6,343,320 B1 | * | 1/2002 | Fairchild et al. | 709/224 |
| 6,397,246 B1 | * | 5/2002 | Wolfe | 709/217 |
| 6,463,418 B1 | * | 10/2002 | Todd | 705/26 |
| 6,634,008 B1 | * | 10/2003 | Dole | 716/1 |
| 6,742,165 B2 | * | 5/2004 | Lev et al. | 716/1 |
| 6,748,419 B2 | * | 6/2004 | Grayson et al. | 709/205 |
| 6,915,265 B1 | * | 7/2005 | Johnson | 705/2 |

* cited by examiner

*Primary Examiner*—Dustin Nguyen
(74) *Attorney, Agent, or Firm*—W. James Brady; Frederick J. Telecky, Jr.

(57) ABSTRACT

A distributed web CGI architecture is disclosed. According to one embodiment of the present invention, distributed web common gateway interface architecture includes a primary network having a primary server (304). A database (210) communicates with the primary server (304). A plurality of secondary networks (202) are provided, with at least one secondary server (302) in the secondary network (202). In another embodiment, a method for the distribution of data files in a distributed organization is provided. The distributed organization has a multiple networks that communicate with the primary server. The method involves the steps of (1) validating a data file at a secondary server in one of the networks; (2) correcting defects in the data file if the validation fails; (3) releasing a validated data file to the primary server; (4) and transferring the validated data file to the primary server.

16 Claims, 4 Drawing Sheets

DISTRIBUTED WEB CGI ARCHITECTURE

This application claims priority under 35 USC § 119(e)(1) of provisional application No. 60/173,751, filed Dec. 30, 1999.

BACKGROUND OF INVENTION

1. Field of the Invention

This invention relates to the field of Internet technologies for computer systems; specifically, it relates to a distributed web CGI architecture.

2. Description of the Related Art

User Interface through web browsers, such as Netscape® and Internet Explorer®, is becoming a standard for Client/Server applications. A Client/Server application typically performs three types of operations, including Application Logic, Presentation Logic, and Data Management Logic.

Application Logic represents the behavior of the system, Presentation Logic represents the User Interface of the system, and Data Management Logic represents the managing the data in a Database Management System, such as Relational DBMS or Object Oriented DBMS. A Web Browser can be used to perform the Presentation Logic of a Client/Server application. This can be done using HTML documents that are dynamically generated. These documents may contain HTML tags and JavaScript code that is read by the Browser to render Graphical User Interface. This type of interface may be referred to as a Web User Interface ("WUI"). A WUI consists of HTML tags, HTML form elements, and JavaScript code. All of these may reside in a HTML document.

A Common Gateway Interface ("CGI") is a technique used to construct a WUI to an application. When a user invokes any operation in the WUI, the Web Browser sends the request to the Web Server, which in turn invokes CGI programs. The CGI programs perform the requested task, and send the result back the Web Server. The result is expressed in terms of HTML documents. The Web Server sends the dynamically-generated HTML documents to the Web Browser which, in turn, renders the WUI. In this process, the CGI program might need to access the DBMS to have the Data Management Logic performed.

SUMMARY OF THE INVENTION

Therefore, a need has arisen for distributed web CGI architecture.

According to one embodiment of the present invention, a distributed web common gateway interface architecture is disclosed. The distributed web common gateway interface architecture includes a primary network having a primary server. A database communicates with the primary server. A plurality of secondary networks are provided, with at least one secondary server in the secondary network.

In another embodiment, a method for the distribution of data files in a distributed organization is provided. The distributed organization has a multiple networks that communicate with the primary server. The method involves the steps of (1) validating a data file at a secondary server in one of the networks; (2) correcting defects in the data file if the validation fails; (3) releasing a validated data file to the primary server; (4) and transferring the validated data file to the primary server.

According to another embodiment of the present invention, a method for the distribution of data files in a distributed organization is provided. The distributed organization has a plurality of networks that communicate with a primary server, and each network has a web browser running on it. The method involves the steps of (1) entering a URL of a data management system for a primary server in a web browser; (2) entering user information; (3) entering metadata for a data file to be transferred to the primary server; (4) validating the data file at the secondary server; (5) correcting errors responsive to a failed validation; (6) releasing the validated data file; (7) transferring the validated data file to the primary server; and (8) storing the data files in the primary server.

A technical advantage of the present invention is that a distributed web CGI architecture is disclosed. Another technical advantage of the present invention is that a secondary server is used to validate data files before they are transferred to a primary server. Another technical advantage of the present invention is that errors are detected before the file is transferred, saving time and bandwidth.

DESCRIPTION OF PREFERRED EMBODIMENTS

Figure 1:
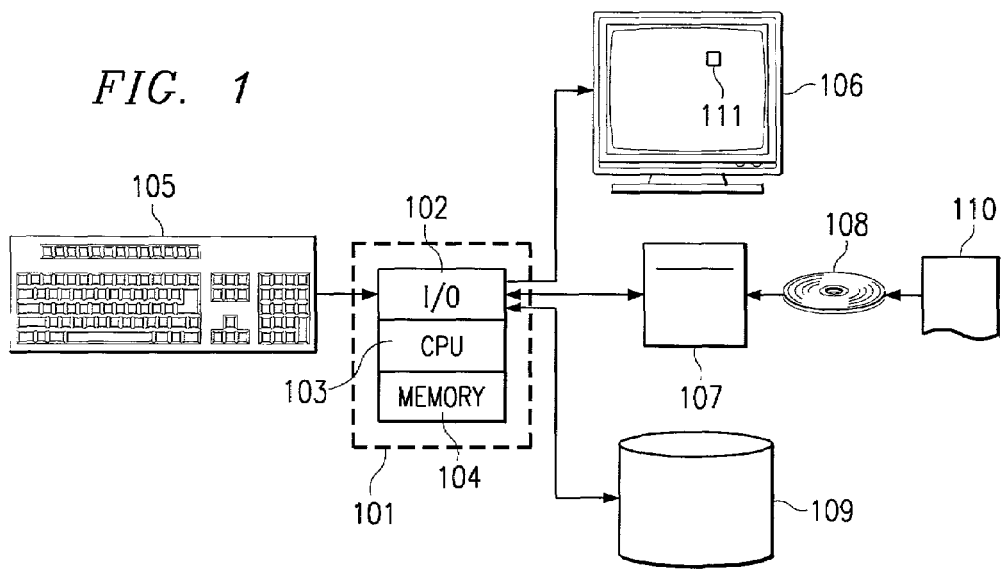
FIG. 1 illustrates a portion of a computer, including a CPU and conventional memory in which the presentation may be embodied.

Embodiments of the present invention and their technical advantages may be better understood by referring to FIGS. 1 though 5, like numerals referring to like and corresponding parts of the various drawings.

The environment in which the present invention is used encompasses general distributed computing system, wherein general purpose computers, workstations, or personal computers are connected via communication links of various types, in a client-server arrangement. Programs and data, many in the form of objects, are made available by various members of the system for execution and access by other members of the system. Some of the elements of a general purpose workstation computer are shown in FIG. 1, wherein processor 101 is shown, having input/output ("I/O") section 102, central processing unit ("CPU") 103, and memory section 104. I/O section 102 may be connected to keyboard 105, display unit 106, disk storage unit 109, and CD-ROM drive unit 107. CD-ROM unit 107 can read a CD-ROM medium 108, which typically contains programs and data 110.

Figure 2:
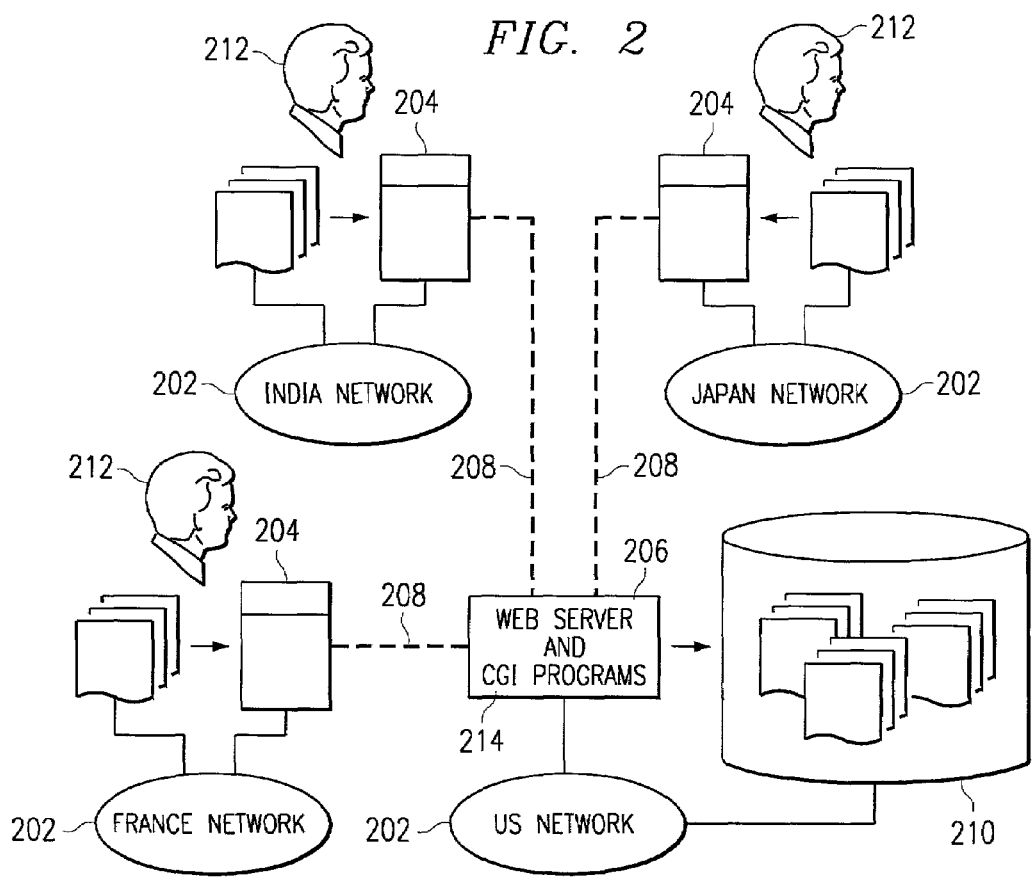
FIG. 2 illustrates a Data Management System for a Distributed Organization.

Referring to FIG. 2, distributed organization 200 with many development centers 202 located geographically is depicted. Development centers 202 may be located in different countries and continents. Development centers 202 produce deliverable files 204 as part of their work. Examples of deliverable files 204 include files created by CAD tools in a design organization. Deliverable files 204 may be files with sizes ranging from a few kilobytes to over several hundred megabytes, or larger. Deliverable files 204 may be sent via network 208 to database management system (DBMS) 210, which may be located at a central location, where they are stored and managed for long term needs.

The process of managing the deliverable files of an organization or a company can be done using Web Browsers within an Intranet. An Intranet is a network of computers based on TCP/IP protocol belonging to an organization accessible only by the organization's members or employees. This is advantageous because of availability of Web Browsers in most of the computer platforms and the wide acceptance of Web Browsers among the user community. Development centers 202 use the WUI of a Client/Server application to send deliverable files 204 and associated information to central location 210. The associated information to a deliverable file includes information, such as the employee identification information, a list of new features that were added, etc. This associated data for a deliverable file can be called "metadata." Both deliverable file 204, and its metadata, are stored in DBMS 210. Users 212 may send deliverable file 204 and its metadata to the DBMS 210 by completing a HTML form of the WUI.

Users 212 may enter the metadata and specify the path for deliverable file 204 in the HTML form. The Web Browser reads the file specified, and transmits the complete HTML form (including deliverable file 204) to Web Server 206. Web Server 206, in turn, hands over the incoming data to CGI program 214, which receives deliverable file 204 and its corresponding metadata and stores in DBMS 210. These systems are commonly referred as "Data Management" systems.

The required time for this release operation primarily depends on the time taken to transmit deliverable files 204 to DBMS 210, assuming the time required to store deliverable files 204 in DBMS 210 and to transfer and store the metadata is relatively very small. The transmission time depends on several factors, including, inter alia, network bandwidth between the development center 202 and DBMS 210, size of deliverable file 204, and number of other operations which are sharing the bandwidth. It is possible that it might take up to a few hours for the complete operation.

Considering the required amount of time to perform the operation, it is important that only the correct deliverable files are transmitted over the network. This means the deliverable files need to be checked against the expected specification before they are transmitted. This process is called the "validation" of deliverable files. It is not possible to do this validation in a WUI because Web Browsers generally cannot read/write files, and cannot create and run new processes on the machines where they are running. It is not possible to run any validation logic on the file before starting transfer of that file to the Web Server. This forces the validation to be shifted to the CGI program residing at the Server side, which performs validation before storing the deliverable files in the DBMS. If the validation fails, the deliverable file needs to be corrected and released again from its respective development center. This is done by generating a HTML page which contains the validation errors for the given deliverable files. Users can then correct deliverable files and resubmit the deliverable files and its metadata through the WUI.

The Data Management System depicted in FIG. 2 has several disadvantages. First, it has a slow response time. Users who release deliverable files come to know about the validation failure and the cause for it only after the transfer through the network is complete and validation logic is performed at the Web Server side. This may take several hours when the size of the deliverable files are in megabytes.

Next, network bandwidth is wasted. When the validation fails, the deliverable file has to corrected and released again from its respective development center. Thus, network bandwidth that was consumed to transfer the faulty deliverable files is wasted.

Figure 3:
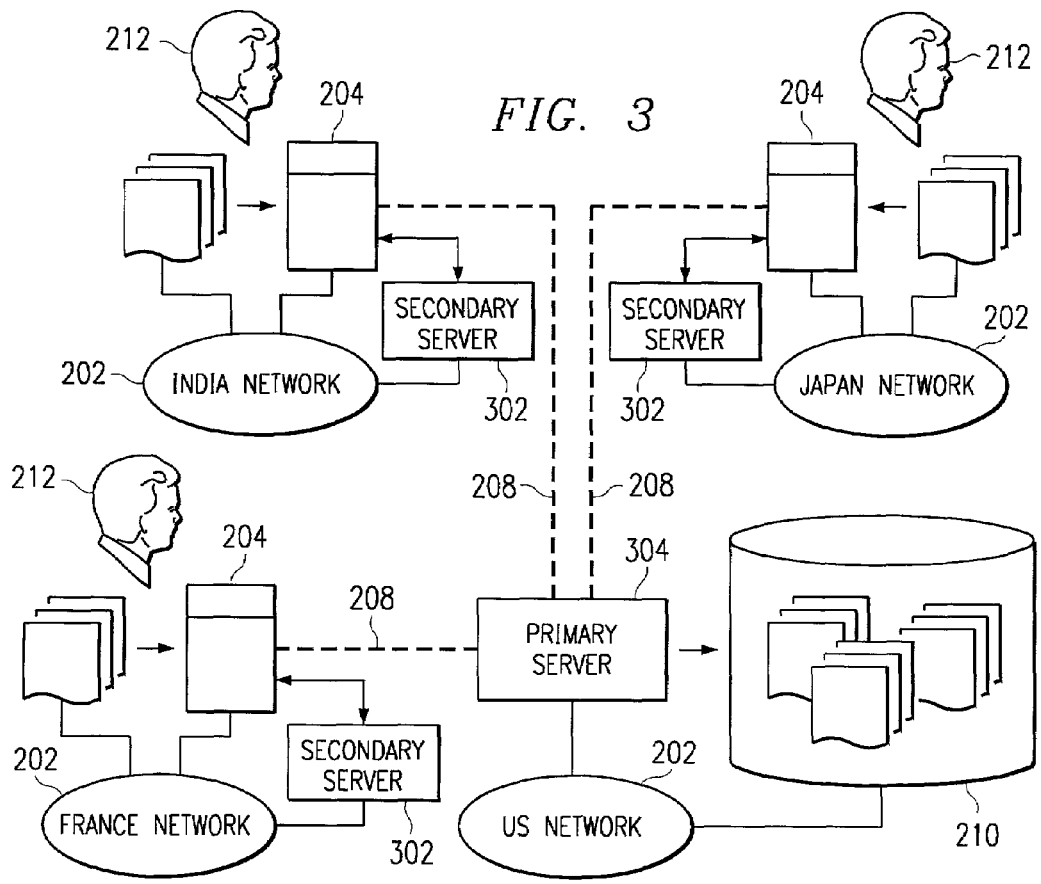
FIG. 3 illustrates a Data Management System for a Distributed Organization according to one embodiment of the present invention.

Referring to FIG. 3, a system for data management for a distributed organization according to one embodiment of the present invention is provided. The above-identified problems may be solved if it the validation process is performed before the transfer of deliverable files is started. This will ensure that no faulty files are sent through the network. Moreover, users will come to know about validation errors much quickly. In a typical Client/Server application where the client program is implemented using X Window system, client code can be modified to perform the validation. The X Window system provides a network transparent graphical user interface primarily for the UNIX® operating system. X provides for the display and management of graphical information, much in the same manner as Microsoft Windows® and IBM's Presentation Manager.®

According to one embodiment of the present invention, secondary server 302, that performs the validation, is provided. Secondary server 302 may be placed in the same network in which the web browser is running. Secondary server 302 includes web server 206 and CGI programs 214, which implement the validation logic. Secondary server 302 may be installed in each of network 202 from where deliverable files 204 may be released.

When user 212 releases deliverable file 204, user 212 may complete a HTML form and specify a path for deliverable file 204, as well as entering metadata for deliverable file 204. Once the HTML form is complete, user 212 can submit for validation of the deliverable file 204. The form is submitted to the corresponding secondary server 302, located in the same network 202. Secondary server 302 performs the validation process, and communicates the results to user 212.

In one embodiment, users 212 may be required to login into the "Data Management" systems before then can start sending deliverable file 204. User 212 may be identified by an identification, such as his or her employee number, and a password. During login, user 212 can identify the network from which he/she is logging in. Examples for the network can be "india.company.com" (Company India), "japan.company.com" (Company Japan), "dal.company.com" (Company, Dallas, US), etc. This information can be used in forming the "action" URL (Uniform Resource Locator) for validation. This URL will contain address of the nearest secondary server 302 which can perform the validation logic. This URL will be generated by primary server 304 as part of the response to the Login request. In other words, users 212 initially contact primary server 304 for login operation, and specify the network from which they are logged in. The network in which primary server is running may be referred to as the primary network, and the primary network may or may not include its own secondary server 302.

Primary server 304 may respond with the URL of the secondary server 302 that is closest, geographically, to user 212. At best, secondary server 302 will be in the same network 202 from which users 212 are logged in. Primary server 304 maintains the list of secondary servers 302 to implement this.

If the validation is successful, user 212 may submit the same form for "Release," in which case the HTML form is submitted to primary server 304. When submitting the form for both "Validate" and "Release" operations, the selection of the server will be transparent to user 212.

Based on the operation selected, forms may be submitted to different servers. In this example, secondary server 302 will receive deliverable file 204 in the minimum time because it will be a file that may be accessed within that network 202.

Web Server 206 and the associated CGI programs 214 along with DBMS 210 is known as primary server 304. Primary server 304 implements all the capabilities of the system. Secondary servers 302 generally are scaled down version of primary server 304 performing only the validation logic. In one embodiment, there is one primary server 304, and there can be a plurality of secondary servers 302 for each of the network 202 from where deliverable files 204 are released.

This architecture results in a set of distributed Web CGI servers and solves the problems associated with the typical CGI architecture for data management applications.

The advantages of the present invention are as follows. First, network traffic is optimized. The transfer of faulty deliverable files between geographically separated Web Browser and Web Server is eliminated. This reduces amount of network transfer, which is a critical factor for Client/Server applications. Second, response time for users is increased. Users who send deliverable files though the WUI get much faster response on the validation phase because it is done by the secondary server with minimum/no network transfer. Third, because validation is done by secondary servers and no faulty deliverable files will reach the primary server, load on primary server is reduced.

Figure 4:
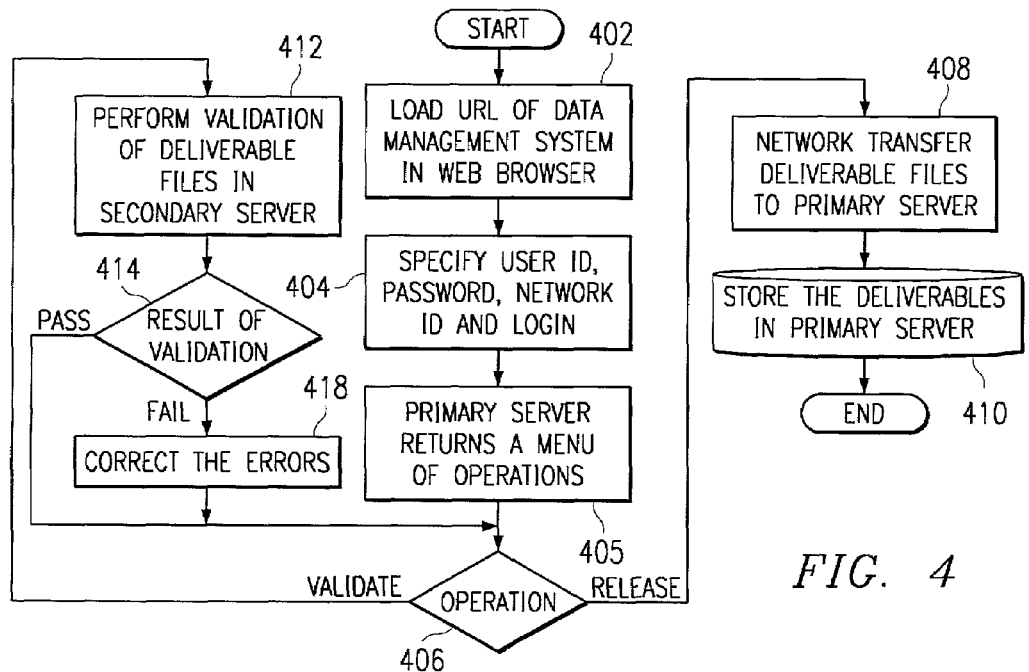
FIG. 4 is a flowchart illustrating the process of one embodiment of the present invention.

Referring to FIG. 4, a method of transferring data using a distributed Web CGI Architecture according to one embodiment of the present invention is provided. The data may be in the form of deliverable files.

In step 402, the URL of the data management system in the web browser is loaded. Users may enter the URL in the URL location field of Web Browser, or they can select the URL from a collection of "bookmarks" that may be stored in the Web Browser.

In step 404, the user provides information to the system, including, inter alia, user identification, password, and network identification, and submits the HTML form to the Primary Sever.

Figure 5A:
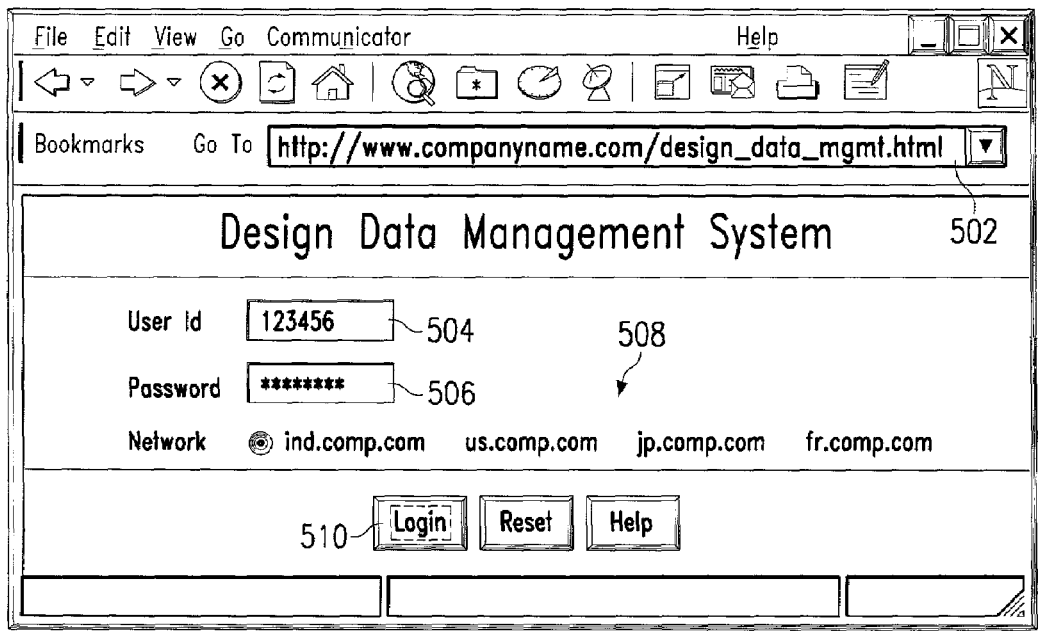
FIGS. 5a-5d are exemplary screen shots that are provided to the user according to one embodiment of the present invention.

Referring to FIG. 5a, an exemplary screen shot for steps 402 and 404 is provided. URL 502 is loaded into the web browser. Employee identification and password are entered in user id space 504 and password space 506, respectively. The user selects the network 508 from which the user is logging in from. The user logs in to the network by selecting login button 510.

Referring again to FIG. 4, in step 405, the primary server in turn returns a menu of operations that users may invoke. These operations may include validate a file, release a file, download an existing deliverable file, search for a deliverable file, generate various reports on the available deliverable files such as list of deliverable files released during given time period, list of deliverable files released from a particular geographical development center, etc. For the validate operation, the action URL (the Web Server and the CGI program that will process the request) points to the Secondary Server.

In step 406, the user selects the operation to perform. Generally, the user will validate the file before the user releases the file. In one embodiment of the present invention, the user is not permitted to release the file until the file is validated.

Figure 5B:
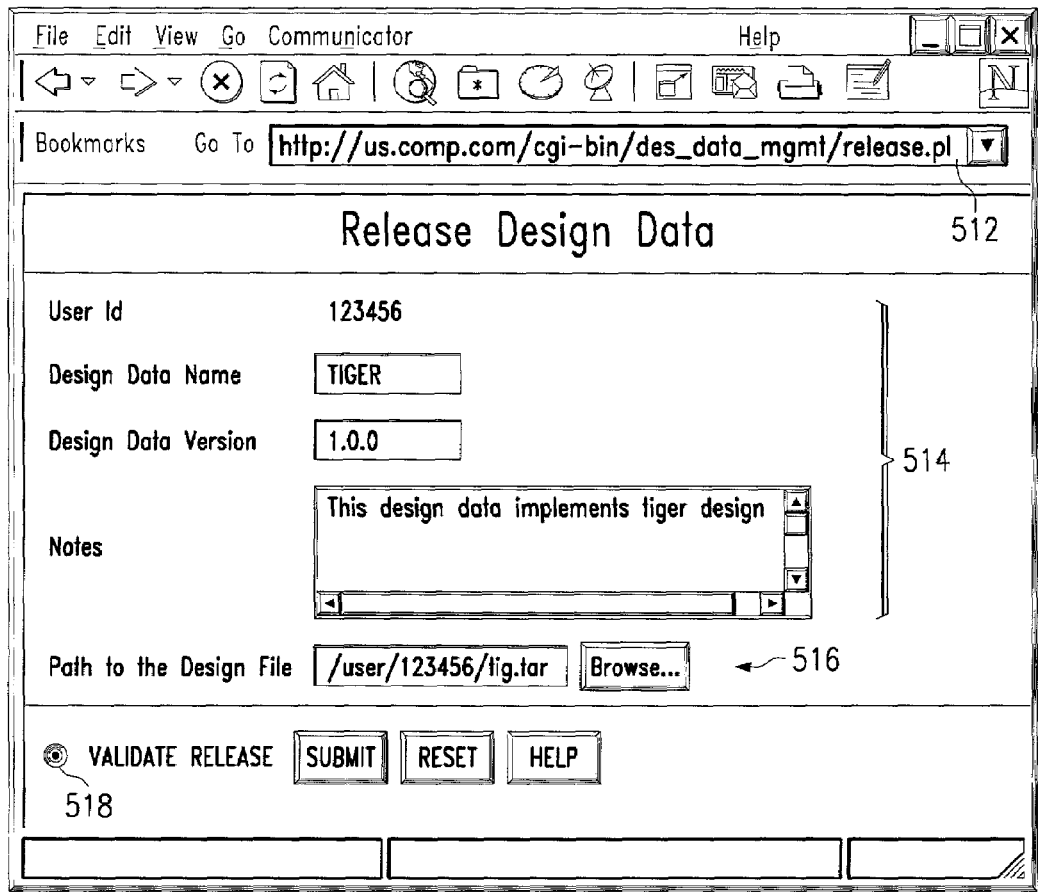

If the user chooses to validate the file, in step 412, the HTML form is submitted to the secondary server, which reads the files and performs validation. Referring to FIG. 5b, an exemplary screen shot of step 412 is provided. Primary server 512 is identified for the user. The user inputs metadata 514 into text boxes, such as the Design Data Name, Design Data Version, and Notes. The text boxes in which metadata 514 is entered may be pre-formatted for uniformity. Other metadata may be entered.

Path 516 may be provided for the user to enter the location of the design file. A "browse" option may be provided, as is known in the art.

The user may select the operation 518 to perform. In the figure, the user may select between "validate" and "release." Once the user selects the operation, the user may click on "submit" to execute the operation.

Referring again to FIG. 4, in step 414, if the validation is successful (pass), the system returns to step 406, where the user can choose to release the file. If the validation failed, in step 418, any identified errors are corrected, if possible. The system then returns to step 406, where the user may select to release the file.

Figure 5C:
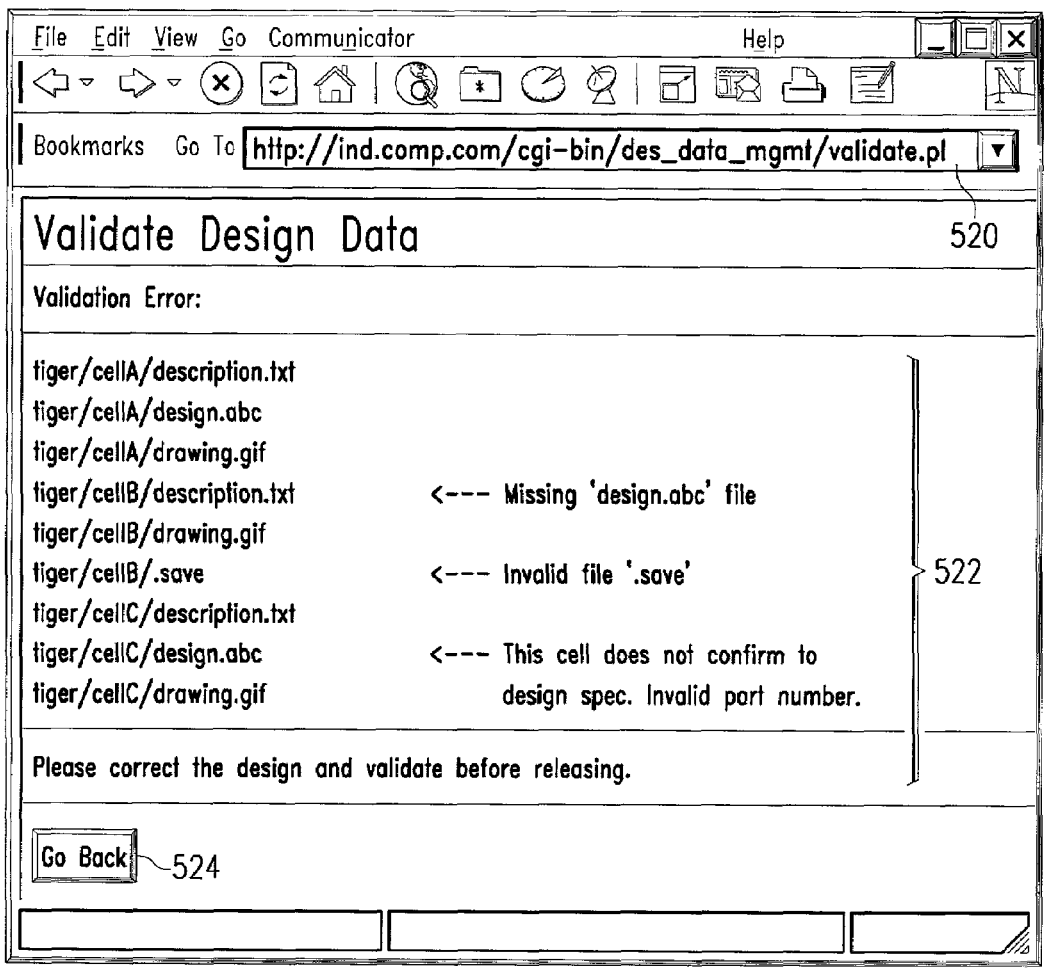

The results of the validation may be provided for the user. Referring to FIG. 5c, an exemplary screen shot of a Validation Design Data screen is provided. The address of the secondary server 520 is provided for the user. Validation output 522 is displayed. In the figure, the file had multiple errors, all of which are identified for the user. The user may be requested to correct the design and revalidate the data before releasing the file. "Go back" button 524 may be provided to allow the user to return to the previous screen.

Referring again to FIG. 4, in one embodiment of the present invention, if the errors could not be corrected in step 418, the system may prevent the user from releasing the file.

If, in step 406, the user chooses to release data, the network, in step 408, transfers deliverable files to the primary server. Next, in step 410, the network stores the deliverable files in the primary server.

Figure 5D:
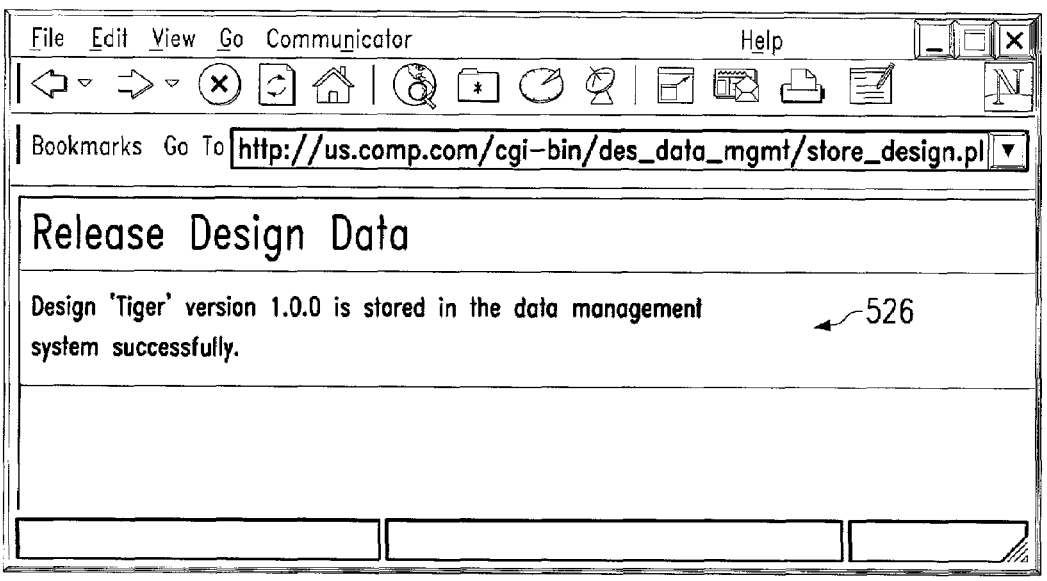

According to one embodiment of the present invention, the user may be provided with release design data. Referring to FIG. 5d, an exemplary screen shot of step 410 is provided. In this figure, the user is provided with message 526, which informs the of the status of the release of the file.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims, without departing from the scope claimed below.

What is claimed is:

1. A distributed web common gateway interface architecture, comprising:
   a primary network having a single primary server for processing validated files;
   a database communicating with the primary server;
   a plurality of secondary networks; and at least one secondary server for each secondary network wherein the secondary server only validates a data file and communicates results to a user before it is released to the primary server.

2. The distributed web common gateway interface architecture of claim 1, further comprising:
a web browser operating on each of the networks.

3. The distributed web common gateway interface architecture of claim 1, further comprising a data file existing on one of said secondary networks;
wherein the secondary server validates a data file before it is released to the primary server.

4. The distributed web common gateway interface architecture of claim 2, wherein the web browsers communicate via an intranet.

5. The distributed web common gateway interface architecture of claim 1, wherein each network is associated with a development area.

6. A method for the distribution of data files in a distributed organization, the distributed organization having a plurality of networks communicating with a single primary server, comprising:
validating a data file at a secondary server in each one of the plurality of networks wherein said secondary server only functions to validate a data file and communicate results to a user before that file is sent to the primary server;
correcting defects in the data file in response to a failed validation;
releasing a validated data file to the primary server for processing validated files; and
transferring the validated data file to the primary server.

7. The method of claim 6, further comprising:
entering a URL of a data management system;
wherein the validated file is stored in the data management system after it is transferred to the primary server.

8. The method of claim 6, further comprising:
entering user information to identify a user.

9. The method of claim 8, wherein the information is entered in a web browser.

10. The method of claim 6, further comprising:
providing user with release data after the data file is released.

11. A method for the distribution of data files in a distributed organization, the distributed organization having a plurality of networks communicating with a single primary server, each network having a web browser running on it, comprising the steps of:
entering a URL of a data management system for a primary server in a web browser;
entering user information;
entering metadata for a data file to be transferred to the single primary server for processing a validated data file;
validating the data file at a secondary server that only functions to validate a data file and communicating results to a user before that file is sent to the primary server;
correcting errors responsive to a failed validation;
releasing the validated data file;
transferring the validated data file to the primary server;
storing the data files in the primary server.

12. The method of claim 11, wherein the metadata comprises at least one of a design data name, design data version, and notes.

13. The method of claim 11, wherein the metadata comprises a design data name, a design data version, and a note.

14. The method of claim 11 wherein the metadata is entered in an HTML form.

15. The method of claim 11, further comprising the step of entering a path for the design file.

16. The method of claim 11, further comprising the step of providing release data after the data file is delivered.

* * * * *